United States Patent [19]

McDaniel et al.

[11] Patent Number: 4,535,070
[45] Date of Patent: Aug. 13, 1985

[54] ACRYLAMIDE POLYMER USED TO REDUCE FINES IN ALUMINUM PHOSPHATE GEL

[75] Inventors: Max P. McDaniel; Marvin M. Johnson; Gil R. Hawley; John Westerman; Paul D. Smith, all of Bartlesville, Okla.

[73] Assignee: Phillips Petroleum Company, Bartlesville, Okla.

[21] Appl. No.: 565,251

[22] Filed: Dec. 23, 1983

[51] Int. Cl.$^3$ .................. B01J 27/14; B01J 31/02; C01B 25/26
[52] U.S. Cl. .................. 502/208; 502/162; 502/210; 423/305; 423/306
[58] Field of Search .................. 502/162, 208, 210; 423/305, 306

[56] References Cited

U.S. PATENT DOCUMENTS

| | | | |
|---|---|---|---|
| 3,417,028 | 12/1968 | Montgomery et al. | 252/317 |
| 4,132,669 | 1/1979 | Choca et al. | 502/208 |
| 4,289,652 | 9/1981 | Hunter et al. | 502/210 |
| 4,364,841 | 12/1982 | McDaniel et al. | 252/430 |
| 4,364,842 | 12/1982 | McDaniel et al. | 252/430 |
| 4,364,854 | 12/1982 | McDaniel et al. | 502/210 X |
| 4,364,855 | 12/1982 | McDaniel et al. | 252/437 |

*Primary Examiner*—D. E. Gantz
*Assistant Examiner*—William G. Wright
*Attorney, Agent, or Firm*—French and Doescher

[57] ABSTRACT

Aluminum phosphate having reduced fines is produced by gelling said aluminum phosphate in the presence of an acrylamide polymer. The resulting support is of primary utility as a base for a chromium olefin polymerization catalyst but is also suitable as a support for titanium catalysts such as $TiCl_3$, $TiCl_4/MgCl_2$ and other conventional catalysts typically associated with polymerization of propylene.

18 Claims, No Drawings

ACRYLAMIDE POLYMER USED TO REDUCE FINES IN ALUMINUM PHOSPHATE GEL

BACKGROUND OF THE INVENTION

This invention relates to the production of aluminum phosphate gel.

Aluminum phosphate gel has long been known as a base for various catalysts including chromium olefin polymerization catalysts. However, it has never achieved commercial success because the results obtained therewith have not been sufficiently good to make it economically feasible. Recently new techniques have been developed to give an aluminum phosphate which is superior in certain respects to commercial silica supports for chromium olefin polymerization catalysts. Such new techniques are disclosed in McDaniel et al. U.S. Pat. No. 4,364,855 (Dec. 21, 1982), for instance. Aluminum phosphate does, however, suffer the disadvantage of producing fines (undesirably small catalyst particles) when the catalyst is subjected to normal handling operations. The fines present a dual problem in that they complicate the activation procedures and result in the production of polymer fines when the catalyst is used in polymerization. Fines produced during stirring at the hydrogel stage make more difficult subsequent filtering operations as well as remaining as fines in the final catalyst.

SUMMARY OF THE INVENTION

It is an object of this invention to provide an improved aluminum phosphate gel; it is a further object of this invention to provide an improved aluminum phosphate support for chromium olefin polymerization catalysts; it is yet a further object of this invention to reduce fines formation during the hydrogel stage, thus facilitating filtering; it is yet a further object of this invention to provide an improved polymerization process; and it is still yet a further object of this invention to provide an improved method of producing aluminum phosphate gel.

In accordance with this invention aluminum phosphate is produced in the presence of a water-soluble acrylamide polymer.

DESCRIPTION OF THE PREFERRED EMBODIMENTS

The aluminum phosphate can be produced by combining an aluminum salt with a source of orthophosphate ions in any manner known in the art followed by a neutralizing agent to produce a hydrogel. Thereafter water is removed to produce a zerogel. Preferably, however, the aluminum phosphate is produced by combining an aluminum salt and the source of orthophosphate ions in a concentrated mass as disclosed in McDaniel et al. U.S. Pat. No. 4,364,855 (Dec. 21, 1982) the disclosure of which is hereby incorporated by reference and in McDaniel et al. U.S. Pat. No. 4,364,854 (Dec. 21, 1982) the disclosure of which is hereby incorporated by reference.

Briefly, this preferred process involves combining an aluminum salt and a source of orthophosphate ions preferably in a concentrated mass. By concentrated mass is meant a system whereby an aluminum salt which melts near or below the boiling point of water is utilized in the molten state or else the ingredients are utilized as a syrup in water with preferably no more than 40 weight percent water based on the weight of aluminum salt being utilized. Even in the melt method it may be desirable to incorporate water and if so this is generally done in an amount of about 1 to 15 weight percent based on the weight of the aluminum salt although up to 20 percent or even up to 40 percent can be utilized.

Generally, hydrated aluminum salts such as hydrated aluminum nitrate are most susceptible to being melted and thus are the preferred source of aluminum ions for the melt method. Aluminum bromide and hydrated aluminum bromate can also be used as can, broadly, any aluminum salt which will melt. Alternatively an aluminum salt which will not necessarily melt but which will dissolve in water to form a syrup as described hereinabove can be utilized. Aluminum sulfate, for instance, is ideally suited for this embodiment of the invention.

The source of phosphate ions can be any source of orthophosphate ions and is generally orthophosphoric acid or an orthophosphate such as monobasic ammonium phosphate or dibasic ammonium phosphate or mixtures thereof.

The temperature, if a melt is used, can be any temperature at or above which the aluminum salt chosen will melt. The reaction can be carried out in any atmosphere including air or can be carried out under any inert atmosphere for instance. Generally temperatures of 65° to 200°, preferably 65° to 100° C. are used.

Neutralization to produce a hydrogel can be carried out using any suitable neutralizing agent but it is generally carried out utilizing ammonia gas or ammonium hydroxide, again these procedures in accordance with the preferred embodiments of the invention being carried out in accordance with said McDaniel et al. patents referred to hereinabove. Water is then removed to give a xerogel.

Alternatively instead of an orthophosphate, a pyrophosphate, a tripolyphosphate, a tetrapolyphosphate, or other polyphosphate, can be the source of phosphate ions.

The water-soluble acrylamide polymer can be incorporated, for instance, by means of an aqueous solution thereof which is simply mixed in any order with the aluminum salt and the source of phosphate or polyphosphate ions. Alternatively the polymer in the form of a powder can simply be dissolved in the concentrated mass prior to gelling.

The acrylamide polymer is used in an amount calculated on a dry basis of about 1 to 20, preferably 2 to 15, more preferably about 10 weight percent based on the weight of the dry aluminum phosphate (zerogel) produced.

The acrylamide polymer employed can be a homopolymer or a copolymer having a sufficiently high molecular weight such that moderately viscous solutions result when the polymer is dissolved in water. This means solutions having a Brookfield LVF viscosity ranging from about 200 to about 5,000 centipoise as 1 wt. % solutions in water (No. 3 spindle at 60 rpm, 23° C., ASTM D 1824).

The functionality of the polymer can be anionic, e.g. sodium acrylate copolymerized with acrylamide, nonionic, presently preferred, and cationic, e.g. beta-methacryloxyethyltrimethylammonium methyl sulfate copolymerized with acrylamide.

Generally, the anionic copolymers are least desired since the alkali metal cation present, if retained by the aluminum phosphate can impair its subsequent catalytic activity.

Also, acrylamide copolymerized with unsaturated carboxylic acid comonomers such as acrylic acid are presently less desirable since it is known that polyvalent cations such as $Al^{+3}$ and $Cr^{+3}$ present in the solution to be gelled can gel a solution of the copolymer. Such a copolymer gel can hinder the controlled formation of the aluminum phosphate gel particles and reduce the effectiveness of the copolymer in this application. N-vinyl-2-pyrrolidone/acrylamide copolymer can also be used. The acrylamide will be the predominant monomer in the copolymer, when employed.

If the purpose is to produce a chromium catalyst support, the aluminum and phosphorus components are selected so as to give an atom ratio of phosphorus to aluminum within the range of 0.2:1 to 1:1, preferably 0.6:1 to 0.9:1. Broadly, however, any ratio, for instance from 0.1:1 to 2:1 can be used with orthophosphates and pyrophosphates with polyphosphates the ratio can be 0.1:1 to 5:1.

When the purpose is to produce a chromium olefin polymerization catalyst the chromium is preferably incorporated by simply utilizing a water-soluble chromium compound which is coprecipitated with the aluminum phosphate. Suitable compounds include chromium acetate, chromium nitrate and chromium oxide, for instance. Broadly any chromium compound known in the art can be utilized. It is also possible to incorporate the chromium compound as an aqueous solution to the hydrogel after formation thereof or as a hydrocarbon solution to the zerogel. The support of this invention can also be utilized as a base for zerovalent and divalent chromium compounds which, of course, are added after calcination.

Chromium is generally present in an amount within the range of 0.001 to 10, preferably 0.1 to 5, more preferably about 1 weight percent based on the weight of the dried gel.

The aluminum phosphate produced in accordance with this invention is activated in the same manner as in the prior art as disclosed in said McDaniel et al. patents, for instance. Generally where chromium is to be converted to the hexavalent state the chromium-containing aluminum phosphate is heated in an oxygen-containing ambient, generally air at a temperature within the range of 300° to 800° C., more preferably 360° to 600° C. for a time of 1 minute to 48 hours, preferably 0.5 to 10 hours.

The catalysts produced using the base prepared by the novel method of this invention are particularly suitable as a support for chromium for the production of polymers of at least one mono-1-olefin containing 2 to 8 carbon atoms per molecule. The catalysts are of particular applicability in producing ethylene homopolymers and copolymers of ethylene and one or more comonomers selected from 1-olefins containing 3 to 8 carbon atoms per molecule such as propylene, 1-butene, 1-pentene, 1-hexene and 1-octene. These polymers can be produced by solution polymerization, slurry polymerization, and gas phase polymerization using conventional equipment and contacting processes. Contacting of the monomer or monomers with the catalyst can be effected by any manner known in the art of solid catalysis. One convenient method is to suspend the catalyst in an organic medium and to agitate the mixture to maintain the catalyst in suspension throughout the polymerization process. Typically, predominantly ethylene copolymers are prepared using 0.5-20 weight percent comonomer as described above in the feed, preferably sufficient comonomer to give 97 to 99.6 weight percent polymerized ethylene units in the resulting copolymer, or the feed can consist essentially of ethylene to give polyethylene homopolymer.

When the novel method of making a phosphate of this invention is used to make a phosphate for a catalyst base for a chromium or vanadium olefin polymerization catalyst, the resulting catalyst can be used in conjunction with a cocatalyst if desired. Suitable cocatalysts include organic compounds of elements of Periodic Groups IA, II, IIIA compounds primarily aluminum and boron alkyls. The most preferred boron compounds are trihydrocarbylboron compounds, particularly trialkylboron compounds, such as tri-n-butylborane, tri-propylborane, and triethylborane (TEB). Also preferred are boron alkorides. Suitable aluminum alkyls include $R_3Al$, $R_2AlX$, and $RAlX_2$ where R is a 1 to 12 carbon atom hydrocarbyl radical and X is a halogen, preferably chlorine. Triethyl-aluminum and diethylaluminum chloride are particularly suitable. The support of this invention can also be used to carry a titanium catalyst such as $TiCl_3$, $TiCl_4/MgCl_2$, and other catalysts typically associated with the polymerization of propylene.

If desired, further reduction of fines can be achieved by a process comprising: (1) adding an alcoholic acid compound to the aluminum phosphate zerogel; (2) working the mixture, for instance by stirring, during which time a decrease in volume occurs; (3) shaping the material into beads, pellets, extrudate, bricks or other shapes; (4) drying the shaped mixtures; and (5) subjecting the dried product to conventional finishing treatment such as grinding and calcining. This technique can reduce any problem with fines produced at the hydrogel stage and make the zerogel more resistant to generating fines during handling.

The alcoholic acid compound can be an alcoholic solution of nitric or hydrochloric acid or more preferably an alcoholic solution of chromium nitrate whereby the chromium nitrate provides the acidic component and chromium for the catalyst.

EXAMPLE I

Water-Soluble Polymer Present During Gellation of Aluminum Phosphate

A series of catalysts was prepared by combining $Al(NO_3)_3.9H_2O$, $NH_4H_2PO_4$, $Cr(NO_3)_3.9H_2O$ in aqueous solution with a commercially available water-soluble polymer added as an aqueous solution to the mixture. The mixture was stirred to effect dissolution and/or mixing of the components after which sufficient $NH_4OH$ was added to effect gellation, e.g. final pH of about 6–7. The components were added in a ratio such that the P/Al atomic ratio of the aluminum phosphate formed was 0.4 and the calculated amount of Cr in the dry catalyst was 1 wt. %. In the activated catalyst the chromium will be present as the oxide, e.g. $CrO_3$.

After being gelled, the products were aged at 80° C. for 1 hour, washed once with vigorous stirring in water to remove soluble by-products, washed once in isopropanol and dried in a vacuum oven at about 80° C.

Run 1, invention

The water-soluble polymer used was essentially a nonionic polyacrylamide available from Hercules Inc., Wilmington, Del., under the trademark Reten 520. It was found that almost no fines were generated during the production and purification of the aluminum phosphate/chromium-containing gel. After drying and activating (calcining) the dried material in air at 600° C. for 3 hours, a porous product (about same porosity as the control) was obtained. The water-soluble polymer was burned away during the calcining process. The final catalyst had a B.E.T. surface area of 271 m$^2$/g and pore volume of 0.77 cc/g.

Ethylene was polymerized in a 2 liter stirred reactor in the presence of isobutane diluent and 8 ppm triethylborane, based on the diluent, at 95° C. It was found in a 30 minute run that 8 g of polymer was made with 0.0442 g of catalyst. The calculated productivity is about 1860 g polyethylene per gram solid catalyst per 30 minutes. Assuming a linear response in catalytic acitivity, the calculated productivity for 1 hour is 2×1860 or about 3700 g per gram solid catalyst. Such values are typical for this catalyst.

Run 2, comparison

The water-soluble polymer used was a 75% hydrolyzed polyvinyl alcohol having a molecular weight of about 2,000 available from Aldrich Chemical Co., Milwaukee, Wisc.

Run 3, comparison

The water-soluble polymer used was poly(vinylbenzyl trimethyl ammonium chloride), obtained from Scientific Polymer Products, Ontario, N.Y.

Run 4, comparison

The water-soluble polymer used was poly(2-vinylpyridine), obtained from Scientific Polymer Products.

Run 5, comparison

The water-soluble polymer used was carboxymethyl cellulose (CMC).

None of the water-soluble polymers employed in the comparison runs 2-6 was effective in reducing catalyst fines. However, all of the catalysts were equally effective in polymerizing ethylene.

EXAMPLE 2 (CONTROL)

Water-Soluble Polymer Added After Gellation of Aluminum Phosphate

A second series of catalysts was prepared with the water-soluble polymers described in invention run 1 and comparison runs 2, 3 of Example 1. In this series, the aluminum phosphate gel was prepared from the same ratio of components used previously. After gellation was complete the aqueous solution of water-soluble polymer was added to the gel. Each resulting mixture was aged, washed, dried and calcined as before.

It was observed that no reduction in fines resulted from using this method. The polymerization activity of the catalysts was similar in behavior to those of the first example. This shows that the acrylamide polymer must be present during gellation.

While this invention has been described in detail for the purpose of illustration it is not to be construed as limited thereby but is intended to include all changes and modifications within the spirit and scope thereof.

What is claimed is:

1. A method of producing aluminum phosphate comprising as a first step combining an aluminum salt, a source of phosphate ions, and a water-soluble acrylamide polymer with neutralizing agent to form an aluminum phosphate hydrogel; and thereafter as a second step removing water from said hydrogel to form a zerogel.

2. A method according to claim 1 wherein said acrylamide polymer is used in an amount on a dry basis to give 2 to 15 weight percent based on the weight of the dry aluminum phosphate produced.

3. A method according to claim 1 wherein said acrylamide polymer has a Brookfield viscosity ranging from 200 to 5000 centipoise as a 1 wt. % solution in water at 23° C.

4. A method according to claim 1 wherein said aluminum salt and source of phosphate ions are combined in a concentrated mass.

5. A method according to claim 1 wherein said aluminum salt and source of phosphate ions are combined in a melt of said aluminum salt.

6. A method according to claim 5 wherein said aluminum salt is hydrated aluminum nitrate and said source of phosphate ions is monobasic ammonium orthophosphate.

7. A method according to claim 6 wherein said polymer is an acrylamide homopolymer.

8. A method according to claim 7 wherein said polymer is present in an amount within the range of 2 to 15 weight percent based on the weight of said zerogel and wherein said polymer has a viscosity within the range of 200 to 5000 centipoise as 1 wt. % solution in water at 23° C.

9. A method according to claim 6 wherein said acrylamide polymer is a copolymer.

10. A method according to claim 9 wherein said copolymer is a copolymer of acrylamide and N-vinyl-2-pyrrolidone.

11. A method according to claim 6 wherein said neutralizing agent is ammonia or ammonium hydroxide.

12. A method according to claim 6 wherein said polymer is acrylamide homopolymer and wherein a chromium compound is present during said formation of said hydrogel.

13. A method according to claim 12 wherein said chromium compound is chromium nitrate.

14. A method according to claim 1 wherein said neutralizing agent is selected from ammonia or ammonium hydroxide.

15. A method according to claim 12 wherein said chromium is selected from chromium acetate, chromium nitrate, and chromium oxide.

16. A method according to claim 1 wherein a chromium compound is also present in said xerogel.

17. A composition produced by the method of claim 1.

18. A catalyst produced by the method of claim 16.

* * * * *